ized Patent [19]

United States Patent [19]
Nakano et al.

[11] Patent Number: 4,569,027
[45] Date of Patent: Feb. 4, 1986

[54] METHOD AND APPARATUS FOR DETECTING ROTATIONAL SPEED OF ROTARY MEMBER

[75] Inventors: Jiro Nakano, Okazaki; Munetaka Noda, Chiryu, both of Japan

[73] Assignees: Toyota Jidosha Kogyo Kabushiki Kaisha, Toyota; Nippondenso Co., Ltd., Kariya, both of Japan

[21] Appl. No.: 304,048

[22] Filed: Sep. 21, 1981

[30] Foreign Application Priority Data

Sep. 27, 1980 [JP] Japan .................... 55-134710

[51] Int. Cl.$^4$ ............................... G01P 3/42
[52] U.S. Cl. .................... 364/565; 324/160; 180/170; 364/426; 377/24
[58] Field of Search ........... 324/160, 166, 78 D; 235/104; 364/424, 480, 551, 565, 426, 431.03–431.07; 318/332, 333; 377/16, 17, 19, 20, 24; 180/170

[56] References Cited

U.S. PATENT DOCUMENTS

| | | | |
|---|---|---|---|
| 3,469,081 | 8/1964 | Lattman | 364/565 X |
| 3,651,690 | 3/1972 | Padgin et al. | 364/551 X |
| 3,655,962 | 4/1972 | Koch | 364/426 X |
| 3,766,367 | 10/1973 | Sumiyoshi et al. | 364/565 X |
| 3,891,046 | 6/1975 | Oicles | 364/424 X |
| 3,909,714 | 9/1975 | Nakano | 324/78 D |
| 3,968,434 | 7/1976 | Dixon et al. | 364/565 X |
| 4,162,443 | 7/1979 | Brearley et al. | 324/78 D |
| 4,179,740 | 12/1979 | Malin | 364/431.01 X |
| 4,179,922 | 12/1979 | Bouverie et al. | 364/551 X |
| 4,281,388 | 7/1981 | Friend et al. | 364/565 |
| 4,350,950 | 9/1982 | Waldmann et al. | 324/78 D |
| 4,398,260 | 8/1983 | Takahashi et al. | 364/426 X |

Primary Examiner—Errol A. Krass
Assistant Examiner—Kevin J. Teska
Attorney, Agent, or Firm—Cushman, Darby & Cushman

[57] ABSTRACT

A method of detecting the rotational speed of a rotary member, which comprises the steps of detecting, in sequence, a time period indicative of the interval between successive preceding and following angular positions of the rotary member, memorizing in turn from each of the angular positions of the rotary member a series of the time periods detected during one rotation of the rotary member, substituting the foremost time period memorized during one rotation of the rotary member for the foremost time period memorized during the preceding one rotation of the rotary member, and calculating the sum of the substituted time period and the remaining time periods memorized during the preceding one rotation of the rotary member upon detection of each of the angular positions to detect the actual rotational speed of the rotary member.

9 Claims, 8 Drawing Figures

METHOD AND APPARATUS FOR DETECTING ROTATIONAL SPEED OF ROTARY MEMBER

BACKGROUND OF THE INVENTION

The present invention relates to a method and apparatus for determining the rotational speed of a rotary member, and more particularly to a method and apparatus for determining the rotational speed of such a rotary member as an output shaft of an automobile prime mover or an output shaft of a power transmission unit thereby to automatically control in a digital manner the vehicle speed, the operative condition of the prime mover or the like in relation to the determined rotational speed of the rotary member.

In one conventional method of determining the rotational speed of an output shaft of a power transmission unit, a permanent magnet with a plurality of magnetic poles is coupled with a speedometer cable driven by the output shaft, and a reed switch is arranged to magnetically detect the respective magnetic poles of the magnet in sequence so as to produce an electric signal indicative of a time period corresponding to the interval between adjacent magnetic poles of the magnet. In the use of such a permanent magnet, which is commercially available at a low cost, it has been experienced that an irregular interval between adjacent magnetic poles causes an irregularity in the time periods detected by the reed switch, resulting in an erroneous determination of the rotational speed of the output shaft. Due to the erroneous determination of the rotational speed, the proper digital control of the vehicle speed or of the operative condition of the prime mover may not be ensured, and there may occur hunting in the vehicle speed, deviation of the controlled speed from a set speed or the like.

To solve the above problem, it is required to enhance the precision in the position of each of the magnetic poles of the magnet. The requirement, however, may not be economically realized because of the resulting increase of the manufacturing cost of the magnet. In one method of eliminating the error in determination of the rotational speed of the output shaft, it has been proposed to calculate the sum of the time periods detected in sequence by the reed switch during each one rotation of the magnet thereby to regularly detect the rotational time period of the magnet. In the actual practice of the method, however, a smooth, high responsive digital control of the vehicle speed or the operative condition of the prime mover may not be ensured because the regularly detected rotational time period is longer than the individual time periods defined by the intervals between adjacent magnetic poles of the magnet. This is noticeable in the case that a digital computer is adapted to control the vehicle speed or the operative condition of the prime mover.

In another method of determining the rotational speed of an output shaft of an internal combustion engine, a rotary member of magnetic material with a plurality of radial projections is coupled with the output shaft, and an electromagnetic pick-up device is arranged to magnetically detect the respective projections of the rotary member in sequence so as to produce an electric signal indicative of a time period corresponding to the interval between adjacent projections of the rotary member. In the actual practice of the method, unbalance in the air-resistance within an intake manifold causes irregularity in the quantity of air-fuel mixture supplied into respective cylinders of the engine, resulting in irregular rotation of the engine output shaft. This means that the sequence of individual time periods detected by the pick-up device becomes irregular in spite of the regular position of the projections of the rotary member, and that the proper digital control of the operative condition of the engine may not be ensured due to an erroneous determination of the rotational speed of the output shaft caused by the irregularity of the time periods detected. To solve the problem, it has been proposed to calculate the sum of the time periods detected in sequence by the pick-up device during each rotation of the rotary member thereby to regularly detect the rotational time period of the rotary member. In this case, it is also apparent that a smooth, high responsive digital control of the operative condition of the engine may not be ensured for the same reason discussed above.

SUMMARY OF THE INVENTION

It is, therefore, a primary object of the present invention to provide a method and apparatus capable of eliminating erroneous determination of the actual rotational speed of a rotary member caused by irregularity in rotation or an irregular interval between adjacent magnetic poles of a permanent magnet coupled with the rotary member, for the purpose of ensuring a smooth, high responsive digital control of the traveling speed of the vehicle, the operative condition of the prime mover of the vehicle or the like.

According to the present invention briefly summarized there is provided a method of determining the actual rotational speed of a rotary member suitable for controlling a control system of an automotive vehicle, the method which comprises the steps of:

detecting each of angular positions respectively predetermined along a circumference of the rotary member in sequence to produce an electric signal indicative of the detected angular position of the rotary member;

determining, in sequence, a time period indicative of the interval between the preceding and following electric signals respectively indicating adjacent angular positions of the rotary member;

memorizing, in sequence, a series of the time periods corresponding to each one rotation of the rotary member defined respectively by an angular position of the rotary member detected newly in sequence and the remaining angular positions of the rotary member detected before the angular position detected newly in sequence; and calculating the sum of a series of the memorized time periods in sequence to determine the actual rotational speed of the rotary member.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
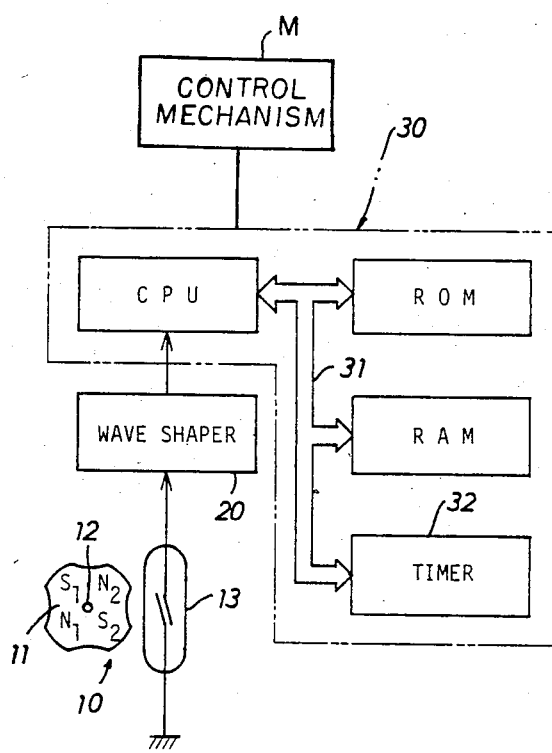
FIG. 1 is a block diagram of a preferred embodiment in accordance with the present invention.

Referring now to FIG. 1 of the drawings, there is illustrated a preferred embodiment of the present invention which is adapted to determine a rotational speed of an output shaft of a conventional power transmission unit for an automotive vehicle. In the figure, a speed sensor 10 includes a disc 11 of permanent magnet which has a plurality of magnetic poles $N_1$, $S_1$, $N_2$ and $S_2$ and is provided on a drive cable 12 of a speedometer associated with the output shaft of the power transmission unit. The speed sensor 10 also includes a reed switch 13 which is located in magnetic coupling relationship with each magnetic pole of the disc 11. When the disc 11 rotates, the reed switch 13 detects the magnetic poles $N_1$, $S_1$, $N_2$ and $S_2$ in sequence to produce first to fourth pulse signals respectively having time periods $A_i$, $B_i$, $C_i$ and $D_i$ (i=1, 2, 3 ... ). The time period $A_i$ of the first pulse signal is defined by a first angular interval between the magnetic poles $N_1$ and $S_1$ of disc 11, and the time period $B_i$ of the second pulse signal is defined by a second angular interval between the magnetic poles $S_1$ and $N_2$ of disc 11. The time period $C_i$ of the third pulse signal is defined by a third angular interval between the magnetic poles $N_2$ and $S_2$, and the time period $D_i$ of the fourth pulse signal is defined by a fourth angular interval between the magnetic poles $S_2$ and $N_1$. In the embodiment, a permanent magnet disc which may be easily obtained in low price is adapted as the disc 11. This means that the above-noted first to fourth angular intervals of the adjacent magnetic poles are irregular from each other.

A digital computer 30 is connected through a wave shaper 20 to the speed sensor 10. The first to fourth pulse signals from speed sensor 10 are reshaped by the wave shaper 20 into first to fourth rectangular pulses respectively. In the embodiment, an SN7414 type wave shaper which is manufactured by Texas Instruments Incorporated in U.S.A. is adapted as the wave shaper 20. The digital computer 30 is a single chip LS1 microcomputer which includes a central processing unit or CPU connected to the wave shaper 20. The microcomputer 30 also includes a read only memory or ROM which is connected through a bus line 31 to CPU, a random access memory or RAM and a timer 32 in the form of a free-running timer. CPU is provided with an interrupt port for receiving each of the first to fourth rectangular pulses from wave shaper 20 as an interrupt signal $INT_i$ (i=1, 2, 3, ... ) in sequence. The timer 32 is cooperable with a crystal oscillator (not shown) such that it initiates measurement of a lapse time upon start of the microcomputer 30 to sequentially produce a series of clock pulses in dependence upon the measured time lapse.

RAM is provided with a plurality of addresses N, N+1, N+2, N+3, N+4 and N+5 and the other addresses. RAM temporarily stores at its address N the newest one of successive time periods $D_i$, $C_i$, $B_i$ and $A_i$ and also stores at its addresses N+1, N+2 and N+3 respectively the remaining ones of the successive time periods $D_i$, $C_i$, $B_i$ and $A_i$. RAM further stores at its address N+4 an interrupt time $t_i$ (i=1, 2, ... ) defined by the interrupt signal $INT_i$ (i=1, 2, ... ) and stores at its address N+5 a rotational speed $V_i$ (i=1, 2, ... ) of the output shaft of the transmission unit which will be calculated by CPU. In addition, various binary signals necessary for controlling the actual vehicle speed in a desired value are applied through an input port (not shown) of microcomputer 30 and the bus line 31 to the other addresses of RAM to be stored at the same addresses.

A predetermined interruption control program described below is previously stored in ROM to be executed by CPU in response to the interrupt signal $INT_i$.

(1) Data which has been already stored in a register of CPU for control of the actual vehicle speed is sheltered by CPU upon starting execution of the interruption control program.

(2) The interrupt time $t_i$ defined by the interrupt signal $INT_i$ is stored by CPU into the register of CPU in response to clock pulses from the timer 32.

(3) A difference between successive interrupt times $t_i$ and $t_{i-1}$ is calculated by CPU as one of the time periods $A_i$, $B_i$, $C_i$ and $D_i$.

(4) The time periods which have been already stored respectively at the addresses N, N+1, N+2 and N+3 of RAM are circularly shifted by one address in sequence to be again stored by CPU at the addresses N+1, N+2, N+3 and N of RAM. Thereafter, the time period stored again at the address N of RAM is erased such that an up-to-date time period following the time period stored again at the address N+1 of RAM is newly stored at the address N of RAM. An up-to-date interrupt time $t_i$ is also stored by CPU at the address N+4 of RAM.

(5) The time periods stored again at the addresses N+1, N+2 and N+3 of RAM are added by CPU to the up-to-date time period stored at the address N of RAM to obtain the added resultant value as the total time period $T_i$ (i=1, 2, ... ). A rotational speed $V_i$ of the output shaft of the transmission unit is calculated by CPU from the following function (1) in dependence upon the total time period $T_i$ to be stored at the address N+5 of RAM.

$$V_i = f(T_i) \tag{1}$$

This function (1) is obtained in consideration with proportional relationship between the total time period $T_i$ and the reciprocal of the rotational speed $V_i$ and is previously stored in ROM.

(6) The sheltered data is returned to the register of CPU. Thereafter, execution from the item (1) to the item (6) is repeated by CPU in response to each interrupt signal $INT_i$. In addition, a conventional program for controlling the actual vehicle speed in a desired value is previously stored in ROM.

CPU is responsive to each interrupt signal $INT_i$ to calculate a rotational speed $V_i$ necessary for controlling the actual vehicle speed in the desired value in accordance with the interruption control program and to store the calculated rotational speed $V_i$ in RAM. The desired vehicle speed value is calculated by CPU from the above-noted conventional program in dependence upon the stored rotational speed $V_i$ and the above-noted various binary signals. This means that CPU produces the calculated desired vehicle speed value as a control signal therefrom. In addition, a control mechanism M receives the control signal from CPU through the bus line 31 and an output port (not shown) of computer 30 to control the actual vehicle speed into the desired value. In the embodiment, a 6801 type microcomputer manufactured by Motorola Inc. in U.S.A. is adapted as the computer 30, and descriptions regarding other construction and function of the microcomputer are eliminated because they are conventionally known in the prior arts.

Hereinafter, operation of the above embodiment will be described in detail in reference to a flow diagram shown in FIG. 2. Assuming that during travel of the vehicle, the reed switch 13 detects the magnetic pole $N_1$ of disc 11 rotating in dependence upon rotation of the output shaft of the conventional transmission unit and produces a first pulse signal with a time period $A_2$, the first pulse signal from reed switch 13 is reshaped by the wave shaper 20 into a first rectangular pulse with the time period $A_2$. At this stage, it is assumed that the above-noted conventional program is repetitively executed by CPU to control the actual vehicle speed in a desired value.

Figure 2:
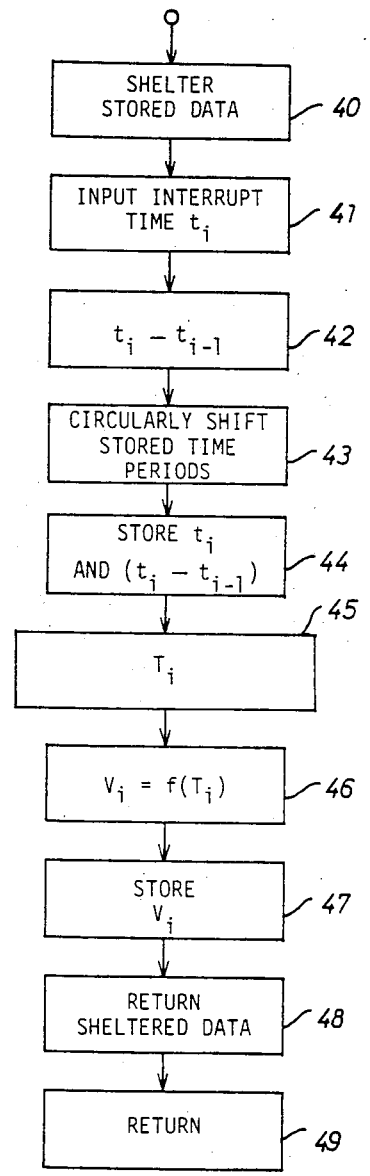
FIG. 2 is a flow diagram illustrating the operation of the digital computer 30 shown in block form of FIG. 1.
Figure 3:
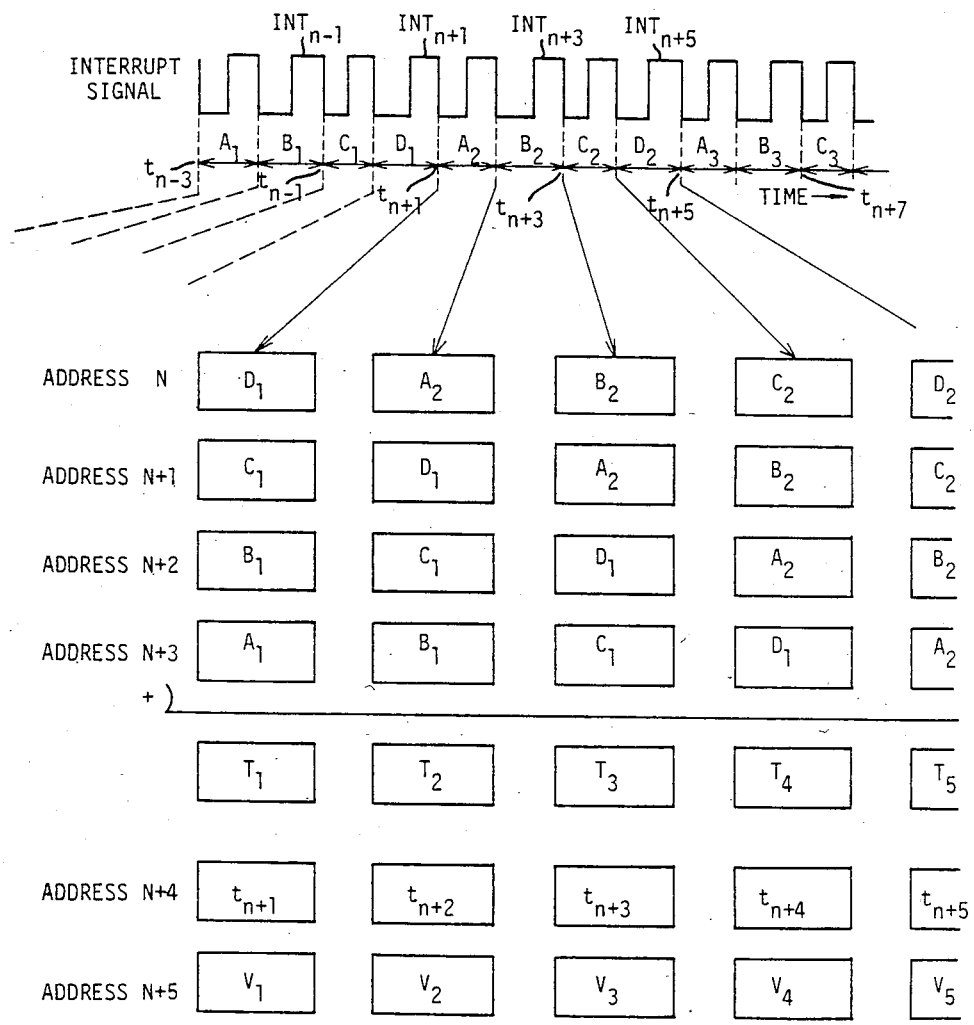
FIG. 3 is a chart illustrating the operation of the random access memory of the digital computer.
Figure 4:
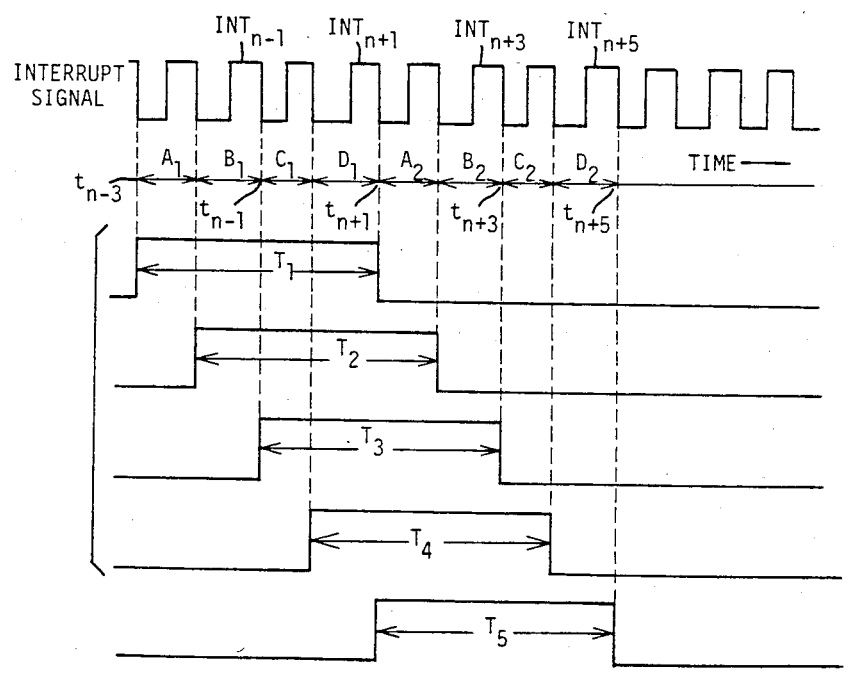
FIG. 4 is a time chart illustrating time periods related to lapse of time.

When CPU receives the first rectangular pulse from wave shaper 20 as an interrupt signal $INT_{n+2}$, it starts to execute the above-noted interruption control program in accordance with the flow diagram of FIG. 2 such that stored data for control of the actual vehicle speed is sheltered at step 40 from the register of CPU. At this stage, it is assumed that time periods $D_1$, $C_1$, $B_1$ and $A_1$ are stored respectively at the addresses N, N+1, N+2 and N+3 of RAM. It is also assumed that an interrupt time $t_{n+1}$ defined by an interrupt signal $INT_{n+1}$ which was issued from the wave shaper 20 prior to the interrupt signal $INT_{n+2}$ is stored at the address N+4 of RAM and that a rotational speed $V_1$ of the output shaft based on a total time period $T_1$ or $(A_1+B_1+C_1+D_1)$ is stored at the address N+5 of RAM (see FIGS. 3 and 4). When the interruption control program proceeds to the following step 41, an interrupt time $t_{n+2}$ is defined on a basis of the interrupt signal $INT_{n+2}$ in response to clock pulses from the timer 32 and is loaded into the register of CPU. Then, the interruption control program proceeds to step 42 where CPU serves to calculate a difference between the interrupt times $t_{n+2}$ and $t_{n+1}$ as the time period $A_2$ of the first pulse signal from the reed switch 13.

When the interruption control program proceeds to step 43, the time periods $D_1$, $C_1$, $B_1$ and $A_1$ stored respectively at the addresses N, N+1, N+2 and N+3 of RAM are circularly shifted by CPU by one address in sequence, and the shifted time periods $A_1$, $D_1$, $C_1$ and $B_1$ are stored by CPU respectively at the addresses N, N+1, N+2 and N+3 of RAM. Then, the interruption control program proceeds to step 44 where the time period $A_1$ is erased by CPU from the address N of RAM to newly store the time period $A_2$ at the same address N and also where the interrupt time $t_{n+1}$ is erased from the address N+4 of RAM to store the interrupt time $t_{n+2}$ at the same address N+4 (see FIG. 3). With the proceeding of the interruption control program from the step 44 to step 45, the time periods $A_2$, $D_1$, $C_1$ and $B_1$ are respectively read out by CPU from the addresses N, N+1, N+2 and N+3 of RAM and then added to each other to obtain the total time period $T_2$ (see FIGS. 3 and 4). Then, CPU calculates a rotational speed $V_2$ at step 46 on a basis of the total time period $T_2$ and the function $V_i=f(T_i)$ read out from ROM and the interruption control program proceeds to step 47 where the calculated rotational speed $V_2$ is stored at the address N+5 of RAM in replacement of the rotational speed $V_1$. When the interruption control program proceeds to step 48, the above-noted sheltered data is returned into the register of CPU to complete execution of the interruption control program. Thereafter, CPU calculates a desired vehicle speed value from the above-noted conventional program on a basis of the stored rotational speed $V_2$, the returned control data of the register and the above-noted binary signals to produce the calculated desired vehicle speed value as a control signal. Thus, the control mechanism M is responsive to the control signal from CPU to control the actual vehicle speed value into the desired value.

When the reed switch 13 detects the magnetic pole $S_1$ of disc 11 to produce a second pulse signal with a time period $B_2$, the second pulse signal from reed switch 13 is reshaped by the wave shaper 20 into a second rectangular pulse with the time period $B_2$ which is applied to CPU as an interrupt signal $INT_{n+3}$. Then, CPU serves again to initiate execution of the interruption control program in accordance with the flow diagram of FIG. 2. When the interruption control program proceeds to step 41, an interrupt time $t_{n+3}$ is defined by CPU on a basis of the interrupt signal $INT_{n+3}$, and a difference between the interrupt times $t_{n+3}$ and $t_{n+2}$ is calculated by CPU at step 42 as the time period $B_2$ of the second pulse signal from reed switch 13.

When the interruption control program proceeds to step 43, the time periods $A_2$, $D_1$, $C_1$ and $B_1$ stored respectively at the addresses N, N+1, N+2 and N+3 of RAM are circularly shifted by CPU by one address in sequence, and the shifted time periods $B_1$, $A_2$, $D_1$ and $C_1$ are stored by CPU respectively at the addresses N, N+1, N+2 and N+3 of RAM. Then, the interruption control program proceeds to step 44 where the time period $B_2$ is newly stored at the address N of RAM in replacement of the time period $B_1$ and also where the interrupt time $t_{n+3}$ is newly stored at the address N+4 of RAM in replacement of the interrupt time $t_{n+2}$ (see FIG. 3). With the proceeding of the interruption control program to step 45 from step 44, the time periods $B_2$, $A_2$, $D_1$ and $C_1$ are respectively read out by CPU from the addresses N, N+1, N+2 and N+3 of RAM and, in turn, added to each other to obtain the total time period $T_3$. Then, a rotational speed $V_3$ is calculated by CPU on a basis of the total time period $T_3$ and the function $V_i=f(T_i)$ from ROM and is stored at the address N+5 of RAM in replacement of the rotational speed $V_2$. Thereafter, the conventional program for control of the actual vehicle speed in the desired value is again executed by CPU upon completion of the interruption control program, as previously described.

When the reed switch 13 detects the magnetic poles $N_2$ and $S_2$ in sequence to produce third and fourth pulse signals respectively with time periods $C_2$ and $D_2$, the total time period $T_3$ is modified by CPU into the total time period $T_4$ or $(C_2+B_2+A_2+D_1)$ under control of the wave shaper 20 in response to the third pulse signal from reed switch 13, and the total time period $T_4$ is modified by CPU into the total time period $T_5$ or $(D_2+C_2+B_2+A_2)$ under control of wave shaper 20 in response to the fourth pulse signal from reed switch 13, as previously described. These modified total time periods $T_4$ and $T_5$ are calculated as rotational speeds $V_4$, $V_5$ in sequence to be stored in RAM, as previously described.

As understood from the above description, each of time periods defined by respective angular intervals between the preceding and following magnetic poles of disc 11 is detected by the reed switch 13 in sequence upon arrival of each of the following magnetic poles to the angular position facing the reed switch 13. When a plurality of time periods are detected by the reed switch 13 in sequence during one rotation of the disc 11, a time period which is detected by the reed switch 13 following the plurality of the detected time periods is added by CPU to a total of the remaining time periods except the oldest time period of the plurality of the detected time periods. Then, the added time periods are produced by CPU as a rotational speed of the output shaft of the transmission unit upon detection of each of the following magnetic poles by the reed switch 13.

Figure 5:
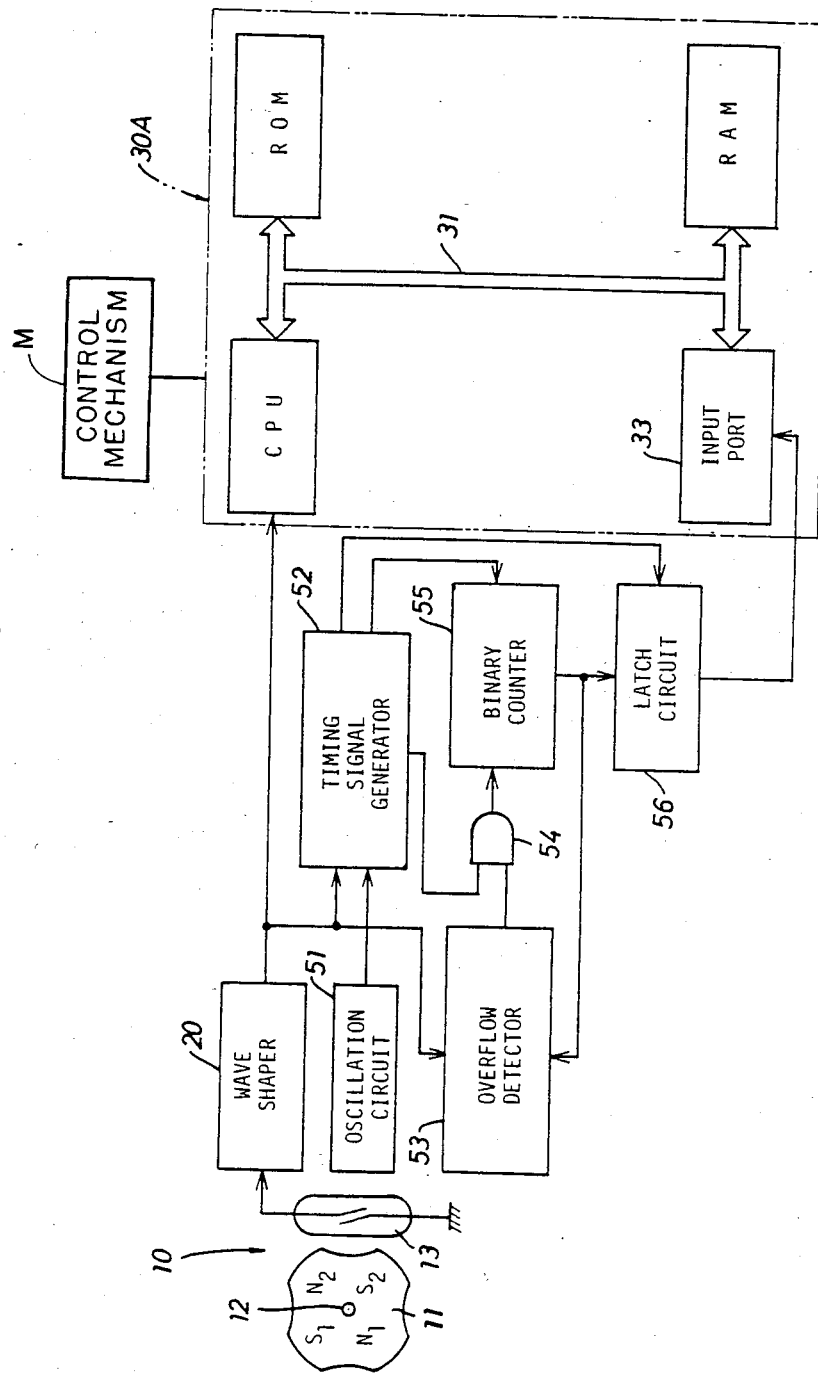
FIG. 5 is a block diagram of a modification of the preferred embodiment shown in FIG. 1.

FIG. 5 illustrates a modification of the above embodiment in which a digital computer 30A is adapted in replacement of the digital computer 30, and a time period calculator 50 is connected between the digital computer 30A and the wave shaper 20. The time period calculator 50 comprises a timing signal generator 52 which is connected to the wave shaper 20 and an oscillation circuit 51. The oscillation circuit 51 includes SN7404 type inverters which are manufactured by Texas Instruments Incorporated in U.S.A. These inverters are cooperable with a crystal oscillator to produce a series of clock pulses at a predetermined frequency. The timing signal generator 52 is responsive to each rectangular pulse from wave shaper 20 to sequentially produce a latch signal, a reset signal and a series of pulse signals in dependence upon a series of the clock pulses from oscillation circuit 51. In the embodiment, as main elements of the timing signal generator 52, adapted are an SN74393 type binary counter and a quad 2 input NAND gate chip of the SN7400 type, each of which are manufactured by Texas Instruments Incorporated. Only a pair of NAND gates of the quad 2 input NAND gate chip are used as a flip-flop in a conventional connection.

The time period calculator 50 also comprises a binary counter 55 which is connected through an AND-gate 54 to the timing signal generator 52 and an overflow detector 53. The overflow detector 53 is formed by SN7474 type D-flip flops which are respectively manufactured by Texas Instruments Incorporated. The overflow detector 53 is reset in response to each rectangular pulse from wave shaper 20 to produce a high level signal and is also set in response to overflow of counter 55 to produce a low level signal. AND-gate 54 receives pulse signals from timing signal generator 52 to pass the same pulse signals in sequence therethrough during generation of the high level signal from overflow detector 53. This means that the number of the pulse signals appearing from AND-gate 54 is defined by a time period of the latch signal from timing signal generator 52. In other words, the number of the pulse signals is defined by a time period of each rectangular pulse from wave shaper 20 or a time period of each pulse signal from reed switch 13.

The binary counter 55 is of an SN74393 type which is manufactured by Texas Instruments Incorporated. Upon receiving the reset signal from timing signal generator 52, the binary counter 55 is reset to count a series of the pulse signals from AND-gate 54 so as to produce a binary signal indicative of the counted number of the pulse signals from AND-gate 54. This means that a value of the binary signal from counter 55 corresponds with a time period of the rectangular pulse from wave shaper 20. A latch circuit 56 is responsive to the latch signal from timing signal generator 52 to latch therein the binary signal from binary counter 55. In addition, generation of the pulse signals from AND-gate 54 is inhibited by the low level signal from overflow detector 53.

The digital computer 30A is provided with an input port 33 which receives the latched binary signal from latch circuit 56 to apply the same signal to CPU through the bus line 31. Furthermore, ROM of computer 30A previously stores therein a modified interruption control program which is different in the following points from the interruption control program of the above embodiment.

(1) The binary signal from input port 33 is stored by CPU in the register of CPU in replacement of the interrupt time $t_i$ of the above embodiment. This means that the step for calculating the difference between the interrupt times $t_i$ and $t_{i-1}$ is unnecessary for the modified interruption control program.

(2) The binary signal stored in the register of CPU is stored in RAM in replacement of the difference $(t_i - t_{i-1})$ and the up-to-date interrupt time of the above embodiment. Additionally the digital computer 30A has the same construction and function as those of the above-noted digital computer 30 except that it is not provided with the timer 32. In this modification, as the digital computer 30A, used is a TLCS12A type microcomputer manufactured by Tokyoshibaura Denki Kabushiki Kaisha in Japan or a 8085 type microcomputer manufactured by Intel Corp. in U.S.A.

Assuming that during travel of the vehicle, the reed switch 13 detects the magnetic pole $N_1$ of disc 11 rotating in dependence upon rotation of the output shaft of the conventional transmission unit and produces a first pulse signal with a time period $A_2$, the first pulse signal from reed switch 13 is reshaped by the wave shaper 20 and applied as a first rectangular pulse with the time period $A_2$ to CPU of digital computer 30A and time period calculator 50. Then, the time period calculator 50 is responsive to the first rectangular pulse from wave shaper 20 to produce a binary signal indicative of the time period $A_2$, as previously described. At this stage, it is assumed that the above-noted conventional program is repetitively executed by CPU of computer 30A to control the actual vehicle speed in the desired value and also that time periods $D_1$, $C_1$, $B_1$ and $A_1$ are stored respectively at the addresses N, N+1, N+2 and N+3 of RAM.

Figure 6:
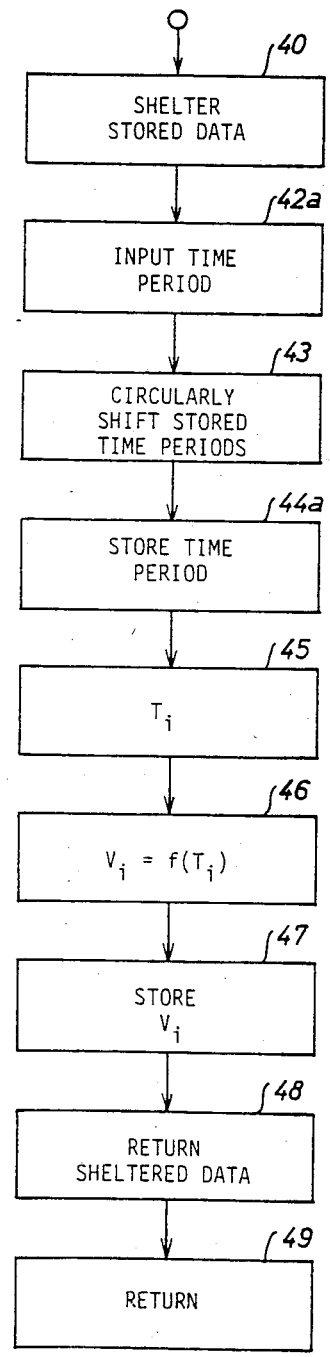
FIG. 6 is a flow diagram illustrating the operation of the digital computer shown in block form of FIG. 5.

When CPU of computer 30A receives the first rectangular pulse from wave shaper 20 as an interrupt signal $INT_{n+2}$, it starts to execute the above-noted modified interruption control program in accordance with a flow diagram shown in FIG. 6. Then, the modified interruption control program proceeds through the step 40 to step 42a where the binary signal indicative of the time period $A_2$ from time period calculator 50 is stored in the register of CPU. When the modified interruption control program proceeds to the step 43, the time periods $D_1$, $C_1$, $B_1$ and $A_1$ stored respectively at the addresses N, N+1, N+2 and N+3 of RAM are circularly shifted by CPU and again stored respectively at the addresses N+1, N+2, N+3 and N of RAM, as previously described. When the modified interruption control program proceeds to step 44a, CPU reads out the time period $A_2$ from the register thereof to newly store the same period $A_2$ at the address N of RAM in replacement of the time period $A_1$. Thereafter, execution at the remaining steps 45 to 49 of the modified interruption control program are conducted in the substantially same manner as that of the previous embodiment. Furthermore, it will be easily understood that the similar operation to the above description may be conducted by CPU on a basis of the modified interruption control program in case each of the remaining magnetic poles $S_1$, $N_2$ and $S_2$ of disc 11 is detected by the reed switch 13. This means that CPU of computer 30A produces a control signal, as previously described, to control the actual vehicle speed into the desired value under cooperation with the control mechanism M.

Figure 7:
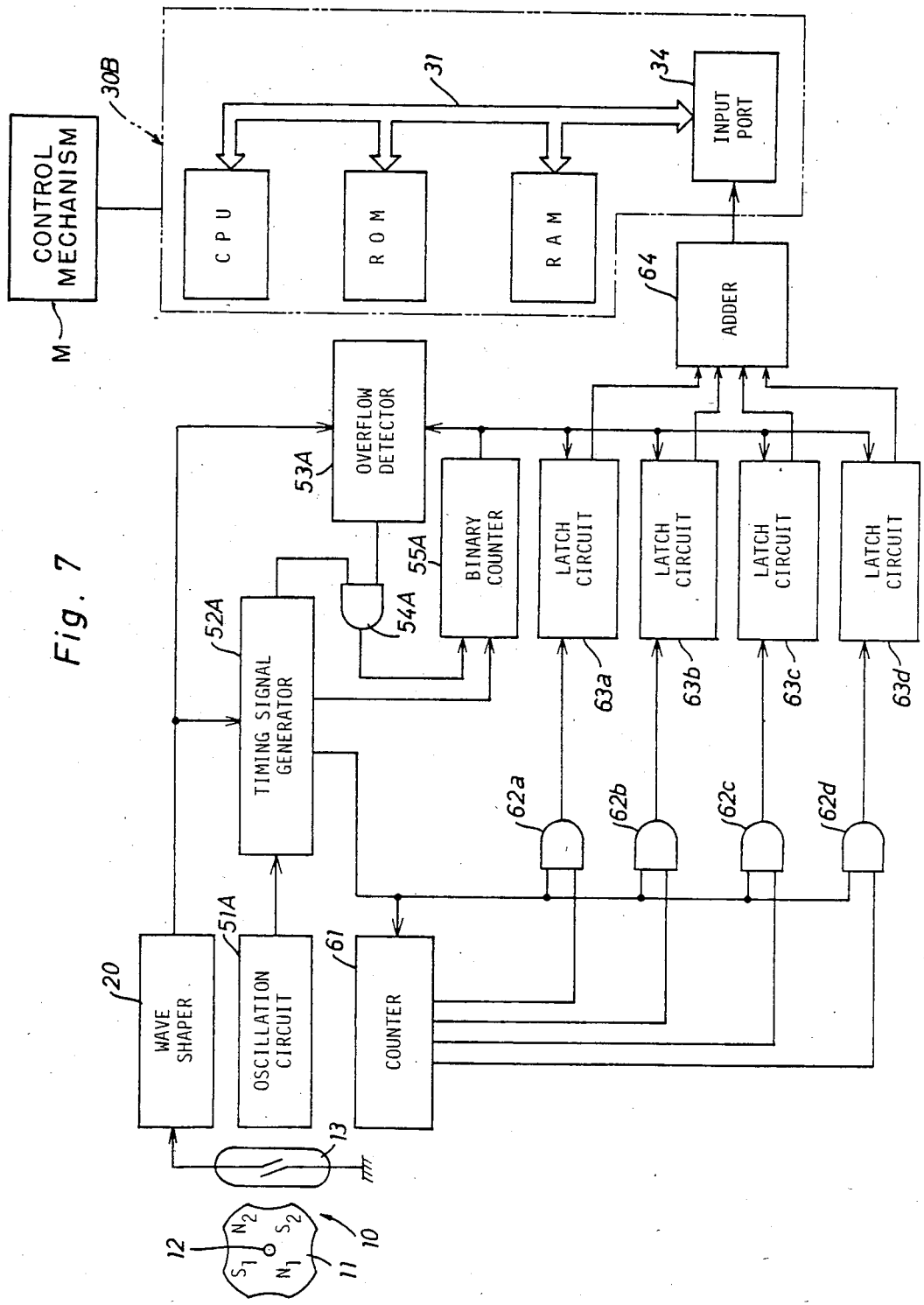
FIG. 7 is a block diagram of another modification of the preferred embodiment shown in FIG. 1.

FIG. 7 illustrates another modification of the previous embodiment in which a digital computer 30B is adapted in replacement of the digital computer 30, and a total time period calculator 60 is connected between the digital computer 30B and the wave shaper 20 of the previous embodiment. The total time period calculator 60 is provided with a latch-selection counter 61 which is connected to a timing signal generator 52A having the same construction and function as those of the timing signal generator 52 of the previous modification. The latch-selection counter 61 is responsive to a latch signal issued repetitively from the timing signal generator 52A to sequentially produce first to fourth high level signals. The first, second, third and fourth high level signals from counter 61 are applied respectively to AND-gates 62a, 62b, 62c and 62d. In the modification, as main elements of the counter 61, adapted are an SN74393 type binary counter, an SN7404 type inverter and an SN7442 type BCD-to-DECIMAL decoder which are manufactured by Texas Instruments Incorporated.

AND-gate 62a is responsive to a latch signal from timing signal generator 52A to pass the first high level signal from counter 61 therethrough to a latch circuit 63a, and AND-gate 62b is responsive to a latch signal from timing signal generator 52A to pass the second high level signal from counter 61 therethrough to a latch circuit 63b. AND-gate 62c is responsive to a latch signal from timing signal generator 52A to pass the third high level signal from counter 61 therethrough to a latch circuit 63c, and AND-gate 62d is also responsive to a latch signal from timing signal generator 52A to pass the fourth high level signal from counter 61 therethrough to a latch circuit 63d.

The latch circuits 63a, 63b, 63c and 63d are respectively of an SN7475 type which is manufactured by Texas Instruments Incorporated. The latch circuit 63a is responsive to the first high level signal from AND-gate 62a to latch therein a binary signal issued from a binary counter 55A. The latch circuit 63b is responsive to the second high level signal from AND-gate 62b to latch therein a binary signal issued from binary counter 55A. The latch circuit 63c is responsive to the third high level signal from AND-gate 62c to latch therein a binary signal issued from binary counter 55A. The latch circuit 63d is also responsive to the fourth high level signal from AND-gate 62d to latch therein a binary signal issued from binary counter 55A. The latched binary signals from latch circuits 63a, 63b, 63c and 63d are applied in sequence to an adder 64. The adder 64 is of an SN7483 type which is manufactured by Texas Instruments Incorporated and serves to add each value of the latched binary signals from latch circuits 63a to 63d so as to produce a binary signal indicative of the added resultant value. This means that the added resultant value corresponds with the above-noted total time period $T_i$. In addition, construction and function of the oscillation circuit 51A, overflow detector 53A, AND-gate 54A and binary counter 55A are substantially the same as those of the oscillation circuit 51, overflow detector 53, AND-gate 54 and binary counter 55 of the previous modification respectively.

The digital computer 30B is provided with an input port 34 which receives the binary signal from adder 64 to store the same signal in RAM. Furthermore, ROM of computer 308B previously stores a predetermined program which is different in the following point from the interruption control program of the above FIG. 7 embodiment.

(1) The binary signal applied to the input port 34 is stored by CPU in the register of CPU in replacement of the execution from the step 40 to the step 45 shown by the flow diagram of FIG. 2. In addition, the digital computer 30B has the same construction and function as those of the above-noted digital computers except that it is not provided with the timer 32. In this modification, as the digital computer 30B, used is the 8085 type microcomputer manufactured by Intel Corp.

Assuming that the reed switch 13 detects the magnetic pole $N_1$ of disc 11 when the above-noted conventional program is transferred to the predetermined program of this modification, a first pulse signal with a time period $A_2$ is produced from reed switch 13 and reshaped by the wave shaper 20 and, in turn, applied as a first rectangular pulse with the time period $A_2$ to the total time period calculator 60. At this stage, it is assumed that a binary signal indicative of a total time period $T_1$ or $(A_1+B_1+C_1+D_1)$ appears from the adder 64 of calculator 60 and also that a first high level signal appears from the counter 61 of calculator 60.

Figure 8:
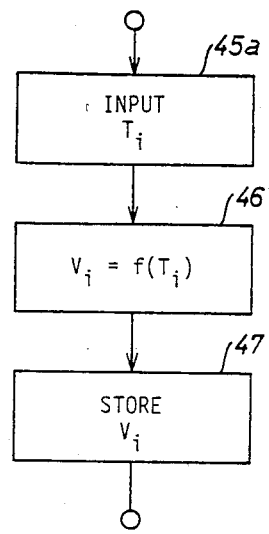
FIG. 8 is a flow diagram illustrating the operation of the digital computer shown in block form of FIG. 7.

When the first rectangular pulse from wave shaper 20 is applied to the total time period calculator 60, as previously described, the timing signal generator 52A serves to produce a latch signal, a reset signal and a series of pulse signals sequentially in dependence upon a series of clock pulses from the oscillation circuit 51A. Then, AND-gate 62a is responsive to the latch signal from timing signal generator 52A to pass the first high level signal from counter 61 therethrough to the latch circuit 63a which latches therein a binary signal indicative of a time period $A_2$ obtained previously in the binary counter 55A. When the adder 64 receives the latched binary signal from latch circuit 63a, it serves to add the time period $A_2$ to a total of the time periods $B_1$, $C_1$ and $D_1$. Then, the added resultant value $(A_2+B_1+C_1+D_1)$ is stored as the total time period $T_2$ in the register of CPU at a step 45a of a flow diagram shown in FIG. 8. Thereafter, with the preceeding of the predetermined program, CPU of microcomputer 30B performs substantially the same execution as that at steps 46, 47 of the previous embodiment.

When the reed switch 13 detects sequentially the magnetic poles $S_1$, $N_2$ and $S_2$ of disc 11 upon repetitive transfer of the above-noted conventional program to the predetermined program of this modification, second, third and fourth pulse signals respectively with time periods $B_2$, $C_2$ and $D_2$ are produced from reed switch 13 in sequence and reshaped by the wave shaper 20 into second, third and fourth rectangular pulses respectively with the time periods $B_2$, $C_2$ and $D_2$. When the timing signal generator 52A of calculator 60 receives the second, third and fourth rectangular pulses from wave shaper 20 in sequence, it repetitively produces a latch signal, a reset signal and a series of pulse signals sequentially in dependence upon each series of clock pulses from oscillation circuit 51A. Then, the latch-selection counter 61 is responsive to the successive latch signals from timing signal generator 52A to produce second, third and fourth high level signals in sequence, AND-gates 62b, 62c and 62d are responsive to the successive latch signals from timing signal generator 52A to pass the second, third and fourth high level signals therethrough respectively, and the binary counter 55A is reset in response to the successive reset signals from timing signal generator 52A to sequentially produce binary signals respectively indicative of the time periods $B_2$, $C_2$ and $D_2$ in dependence upon each series of the pulse signals through AND-gate 54A from timing signal generator 52A. Then, the successive binary signals respectively indicative of the time periods $B_2$, $C_2$ and $D_2$ are latched by the latch circuits 63b, 63c and 63d respectively in response to the second, third and fourth high level signals respectively from AND-gates 62b, 62c and 62d and applied in sequence to the adder 64. Thus, added resultant values $(A_2+B_2+C_1+D_1)$ $(A_2+B_2+C_2+D_1)$ and $(A_2+B_2+C_2+D_2)$ are sequentially obtained by the adder 64 as the total time periods $T_3$, $T_4$ and $T_5$ in relation to the successive binary signals respectively indicative of the time periods $B_2$, $C_2$ and $D_2$ from binary counter 55A and applied in sequence to the input port 34 of microcomputer 30B. Additionally, in the modification, CPU of computer 30B produces a control signal, as previously described, to control the actual vehicle speed into the desired value under cooperation with the control mechanism M.

Although in the above embodiment and modifications the permanent magnet 11 is coupled to the drive cable 12 for the speedometer of the automotive vehicle, it may be also coupled to various rotation members provided with the automotive vehicle. In this case, the number of the magnetic poles of permanent magnet 11 may be changed in necessity, and the reed switch 13 is replaced with magnetic flux detection means such as a reluctance element and the like.

For practice of the present invention, the speed sensor 10 may be replaced with another speed sensor in which a magnetic member having a plurality of equi-spaced projections is coupled to an output shaft of an internal combustion engine and an electromagnetic pick-up is arranged in magnetic relationship with each projection of the magnetic member to ensure substantially the same operation as those of the previous embodiment and modifications, in spite of unbalanced rotational condition of the engine described in the introductory portion of the specification. In this case, the magnetic member of another speed sensor may be also coupled to a cam shaft of a distributor for the engine to ensure the substantially same operation as those of the previous embodiment and modifications.

Although in the foregoing specification a preferred embodiment of the concept underlying the present invention has been described in detail, various other embodiments as well as certain variations and modifications of the embodiment will obviously occur to those skilled in the art upon becoming familiar with said underlying concept. It is to be understood, therefore, that within the scope of the appended claims, the invention may be practiced otherwise than as specifically set forth herein.

What is claimed is:

1. A method of determining the actual rotational speed of a rotary member, the method being suitable for controlling a control system of an automotive vehicle and the method comprising the steps of:

detecting each of angular positions respectively predetermined along a circumference of said rotary member in sequence to produce an electric signal indicative of the detected angular position of said rotary member;

determining, in sequence, a time period indicative of the interval between the preceding and following electric signals respectively indicating adjacent angular positions of said rotary member;

memorizing, in sequence, a series of said time periods corresponding to each one rotation of said rotary member defined respectively by an angular position of said rotary member detected newly in sequence and the remaining angular positions of said rotary member detected before said angular position detected newly in sequence;

calculating the sum of a series of said memorized time periods in sequence to determine a total time period; and determining directly the actual rotational speed of said rotary member in relation to the calculated sum total time period on the basis of a predetermined function representing a relationship between the actual rotational speed of said rotary member and a time period inversely proportional to the actual rotational speed of said rotary member.

2. A method of determining the actual rotational speed of a rotary member as claimed in claim 1, wherein the step of memorizing, in sequence, a series of said time periods includes the step of cancelling the oldest time period of a series of said time periods in sequence to memorize the remaining time periods of a series of said time periods and a time period immediately following the newest time period of a series of said time periods;

wherein the step of calculating the sum of a series of said memorized time periods includes the step of sequentially adding the said memorized remaining time periods of a series of said time periods with the said memorized time period immediately following the newest time period of a series of said time periods so as to determine the total time period; and wherein the step of determining the actual rotational speed of said rotary member includes the step of determining the actual rotational speed of said rotary member in relation to the added time periods on the basis of the predetermined function.

3. A method of determining the actual rotational speed of a rotary member as claimed in claim 1, wherein the step of detecting each of angular positions respectively predetermined along a circumference of said rotary member includes the step of detecting each of magnetic poles of a permanent magnet coaxially provided with said rotary member in sequence to produce an electric signal indicative of the detected magnetic pole of said permanent magnet.

4. A method of determining the actual rotational speed of a rotary member as claimed in claim 1, wherein said rotary member is arranged to be driven by an internal combustion engine.

5. An apparatus for determining the actual rotational speed of a rotary member, the apparatus being suitable for controlling a control system of an automotive vehicle and the apparatus comprising:

speed sensing means for detecting each of angular positions respectively predetermined along a circumference of said rotary member in sequence to produce an electric signal indicative of the detected angular position of said rotary member; and computation means, having memory means for previously storing therein a predetermined function representing a relationship between the actual rotational speed of said rotary member and a time period inversely proportional to the actual rotational speed of said rotary member, for determining, in sequence, a time period indicative of the interval between the preceding and following electric signals respectively indicating adjacent angular positions of said rotary member, for memorizing, in sequence, a series of said time periods corresponding to each one rotation of said rotary member defined respectively by an angular position of said rotary member detected newly in sequence and the remaining angular positions of said rotary member detected before said angular position detected newly in sequence, for calculating the sum of a series of said memorized time periods in sequence to determine a total time period, and for determining directly the actual rotational speed of said rotary member in relation to the calculated sum total time period on the basis of the predetermined function.

6. An apparatus for determining the actual rotational speed of a rotary member as claimed in claim 5, wherein said computation means includes a digital computer.

7. An apparatus for determining the actual rotational speed of a rotary member as claimed in claim 6, wherein said digital computer includes means for cancelling the oldest time period of a series of said time periods in sequence to memorize the remaining time periods of a series of said time periods and a time period immediately following the newest time period of a series of time periods;

means for sequentially adding the said memorized remaining time periods of a series of said time periods with the said memorized time period immediately following the newest time period of a series of said time periods so as to determine the total time period; and means for determining the actual rotational speed of said rotary member in relation to the added time periods on the basis of the predetermined function.

8. An apparatus for determining the actual rotational speed of a rotary member, the apparatus being suitable for controlling a control system of an automotive vehicle and the apparatus comprising:

speed sensing means for detecting each of angular positions respectively predetermined along a circumference of said rotary member in sequence to produce an electric signal indicative of the detected angular position of said rotary member;

a signal generator responsive to the electric signal from said speed sensing means for sequentially producing a latch signal, a reset signal and a series of clock signals;

a counter circuit responsive to the reset signal for counting the number of the clock signals to produce a digital signal indicative of the counted number of the clock signals defining a time period indicative of the interval between the said reset signal and a reset signal immediately following the said reset signal;

a latch circuit responsive to the latch signal for latching said digital signal to produce a latched digital signal; and computation means, including a digital computer having memory means for previously storing therein a predetermined function representing a relationship between the actual rotational speed of said rotary member and a time period inversely proportional to the actual rotational speed of said rotary member, for memorizing a series of said latched digital signals corresponding to each one rotation of said rotary member defined respectively by an angular position of said rotary member detected newly in sequence and the remaining angular positions of said rotary member detected before said angular position detected newly in sequence, for calculating the sum of values of a series of said memorized latched digital signals so as to determine a total time period, and for determining directly the actual rotational speed of said rotary member in relation to the calculated sum total time period on the basis of the predetermined function.

9. An apparatus for determining the actual rotational speed of a rotary member, the apparatus being suitable for controlling a control system of an automotive vehicle and the apparatus comprising:

speed sensing means for detecting each of angular positions respectively predetermined along a circumference of said rotary member in sequence to produce an electric signal indicative of the detected angular position of said rotary member;

a signal generator responsive to the electric signal from said speed sensing means for sequentially producing a latch signal, a reset signal and a series of clock signals;

a counter circuit responsive to the reset signal for counting the number of the clock signals to produce a digital signal indicative of the counted number of the clock signals defining a time period indicative of the interval between the said reset signal and a reset signal immediately following the said reset signal;

a latch-selection circuit for producing a series of latch-selection signals respectively in response to a series of the latch signals corresponding to each one rotation of said rotary member defined respectively by an angular position of said rotary member detected newly in sequence and the remaining angular positions of said rotary member detected before said angular position detected newly in sequence;

a plurality of latch circuits responsive to a series of the latch-selection signals respectively for latching a series of the digital signals as a series of latched digital signals;

an adder circuit for adding values of a series of the latched digital signals; and computation means, including a digital computer having memory means for previously storing therein a predetermined function representing a relationship between the actual rotational speed of said rotary member and a time period inversely proportional to the actual rotational speed of said rotary member, for determining directly the actual rotational speed of said rotary member in relation to the added values on the basis of the predetermined function.

* * * * *